United States Patent
Muthukrishnan et al.

(10) Patent No.: US 11,172,535 B2
(45) Date of Patent: Nov. 9, 2021

(54) SYSTEMS AND METHODS FOR PERSONNEL ACCOUNTABILITY AND TRACKING DURING PUBLIC SAFETY INCIDENTS

(71) Applicant: Eagle Technology, LLC, Melbourne, FL (US)

(72) Inventors: Jothi Muthukrishnan, Lynchburg, VA (US); Jason Moore, Bedford, VA (US); Thomas Fariss, Lynchburg, VA (US)

(73) Assignee: EAGLE TECHNOLOGY, Melbourne, FL (US)

(*) Notice: Subject to any disclaimer, the term of this patent is extended or adjusted under 35 U.S.C. 154(b) by 0 days.

(21) Appl. No.: 16/360,616

(22) Filed: Mar. 21, 2019

(65) Prior Publication Data
US 2020/0305223 A1   Sep. 24, 2020

(51) Int. Cl.
| | |
|---|---|
| H04W 4/029 | (2018.01) |
| H04W 4/80 | (2018.01) |
| G07C 9/00 | (2020.01) |
| H04W 76/40 | (2018.01) |
| G06F 9/54 | (2006.01) |

(52) U.S. Cl.
CPC ............ *H04W 76/40* (2018.02); *G06F 9/542* (2013.01); *G07C 9/00174* (2013.01); *H04W 4/029* (2018.02); *H04W 4/80* (2018.02); *G07C 2009/00261* (2013.01)

(58) Field of Classification Search
CPC ...... H04L 63/1416; H04L 67/12; H04W 4/80; G06F 2221/2111; G06F 9/542
USPC ............................................ 455/41.2, 41.1
See application file for complete search history.

(56) References Cited

U.S. PATENT DOCUMENTS

| | | | |
|---|---|---|---|
| 9,971,327 B2 | 5/2018 | Narain et al. | |
| 10,104,526 B2 | 10/2018 | Metke et al. | |
| 2005/0001720 A1* | 1/2005 | Mason | G01S 5/0072 340/539.13 |
| 2008/0031207 A1* | 2/2008 | Martinez | H04L 69/18 370/338 |
| 2012/0196534 A1* | 8/2012 | Kasslin | H04W 4/06 455/41.2 |
| 2013/0165154 A1* | 6/2013 | Joshi | H04W 4/021 455/456.3 |
| 2014/0361087 A1* | 12/2014 | Lovell | G06K 19/07758 235/492 |
| 2015/0281280 A1* | 10/2015 | Rasband | H04W 12/35 726/3 |

(Continued)

*Primary Examiner* — Syed Ali
*Assistant Examiner* — Jason A Harley
(74) *Attorney, Agent, or Firm* — Fox Rothschild LLP; Robert J. Sacco; Carol E. Thorstad-Forsyth (57) ABSTRACT

Systems and methods for managing an incident event by a public safety and security organization. The methods comprise: performing Near Field Communication ("NFC") or Radio Frequency Identification ("RFID") operations by a Land Mobile Radio ("LMR") and a field computing device to check-in a field personnel member into an incident event; communicating check-in information to a remote computing device from the field computing device via a packet switched LMR infrastructure or a public network; and using the check-in information by the remote computing device to facilitate management of the incident event by the by public safety and security organization.

28 Claims, 6 Drawing Sheets

(56) References Cited

U.S. PATENT DOCUMENTS

| | | | |
|---|---|---|---|
| 2016/0314818 A1* | 10/2016 | Kirk | G11B 27/10 |
| 2017/0178477 A1* | 6/2017 | Turgeon | G08B 13/2451 |
| 2017/0193622 A1* | 7/2017 | Rosado | H04W 12/06 |
| 2017/0251366 A1* | 8/2017 | Perna | G06Q 20/322 |
| 2019/0346840 A1* | 11/2019 | Valeri | G08G 1/202 |

* cited by examiner

SYSTEMS AND METHODS FOR PERSONNEL ACCOUNTABILITY AND TRACKING DURING PUBLIC SAFETY INCIDENTS

BACKGROUND

Statement of the Technical Field

The present disclosure relates generally to radio systems. More particularly, the present disclosure relates to systems and methods for personnel accountability and tracking during public safety incidents.

Description of the Related Art

Public safety personnel have a method for tacking personnel accountability during a particular public safety incident (e.g., a building fire) using hook and loop fastener (e.g., Velcro®) strips. This method utilizes an isolated analog system (e.g., Velcro® board) that prevents information from being easily and quickly shared beyond close proximity of the incident. No other telemetry data (e.g., timestamp data, body sensor vital signs, environmental sensor data, etc.) is captured or recorded due to the simplicity and analog nature of the system Remote resources (e.g., dispatchers, people at the headquarters, etc.) do not have instant access to check-in data from the incident. Additionally, there is no historical record of this data after the incident has concluded.

As an example, when fire fighters arrive on scene of an incident (e.g., a burning structure), they typically take a hook and loop fastener (e.g., Velcro®) strip with their name on it and place it on a whiteboard to check-in to an incident team before entering a burning structure. The firefighters then address the incident (e.g., enter the burning structure and put out the fire). Once the incident is resolved or firefighters are otherwise ready to leave the incident, the firefighters remove the hook and loop fastener (e.g., Velcro®) strip with their name on it from the board, which signals that they have been checked-out of the incident.

SUMMARY

The present disclosure concerns implementing systems and methods for managing an incident event by a public safety and security organization. The methods comprise: performing Near Field Communication ("NFC") or Radio Frequency Identification ("RFID") operations by a Land Mobile Radio ("LMR") and a field computing device to check-in a field personnel member into an incident event; communicating check-in information to a remote computing device from the field computing device via a packet switched LMR infrastructure or a public network; and using the check-in information by the remote computing device to facilitate management of the incident event by the public safety and security organization.

The methods also comprise: performing NFC or RFID operations by the LMR and the field computing device to check-out the field personnel member from the incident event; communicating check-out information to the remote computing device from the field computing device via the packet switched LMR infrastructure or the public network; and/or using the check-out information by the remote computing device to assist in managing the incident event.

In some scenarios, the methods further comprises: performing NFC or Short Range Communications ("SRCs") operations to pair the LMR with at least one sensor worn by the field personnel member; periodically performing SRCs by the LMR to obtain telemetry data generated by at least one sensor paired with the LMR; and/or communicating the telemetry data along with the check-in information and/or the check-out information to the remote computing device.

In those or other scenarios, the methods further comprise: performing NFC operations by the LMR to obtain access to contents of a safe box; communicating a notification of the field personnel's access to the safe box's content from the LMR to the remote computing device via the packet switched LMR infrastructure; and/or communicating telemetry data along with the notification to the remote computing device.

In those or other scenarios, the methods further comprise: performing NFC or RFID operations by the LMR to obtain access to an internal area of a structure that is associated with the incident event; and/or notifying the remote computing device of the field personnel member's access to the internal area of the structure by the LMR or an access point device via the packet switched LMR infrastructure.

In those or other scenarios, the methods further comprise: performing NFC or RFID operations by the LMR and a device installed at a pass-through inside a structure; and notifying the remote computing device of the LMR detection at the pass-through by the LMR via the packet switched LMR infrastructure.

In those or other scenarios, the methods further comprise: performing NFC or RFID operations by the LMR and an access point device when the field personnel member is exiting the structure; and/or notifying the remote computing device of the field personnel member's exiting from the structure by the LMR or access point device via the packet switched LMR infrastructure.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for personnel accountability and tracking during public safety incidents. The systems comprise LMRs including SRC enabled devices, NFC enabled devices, and/or RFID enabled devices. The NFC and/or RFID enabled devices are used by individuals to check-into and/or check-out of an incident event via a field computing device (e.g., a laptop, a tablet, a smart phone, a separate LMR device, or other mobile device).

Check-in/check-out information may be sent from the field computing device to a central location (e.g., dispatch center) for storage and/or processing. Other information may also be sent along with the check-in/check-out information. For example, sensor data, video, audio, and/or image data is sent along with the check-in/check-out information that provides information about a surrounding environment (e.g., a temperature, a structure's physical state, visualization of the surroundings, etc.) and/or the health of the individual(s) at the time of checking-in/checking-out. The check-in information includes, but is not limited to, unique identifiers, check-in times and/or location information (e.g., Global Positioning System ("GPS") coordinates). The check-out information includes, but is not limited to, unique identifiers, check-out times and/or location information (e.g., GPS coordinates).

Illustrative System

Figure 1:
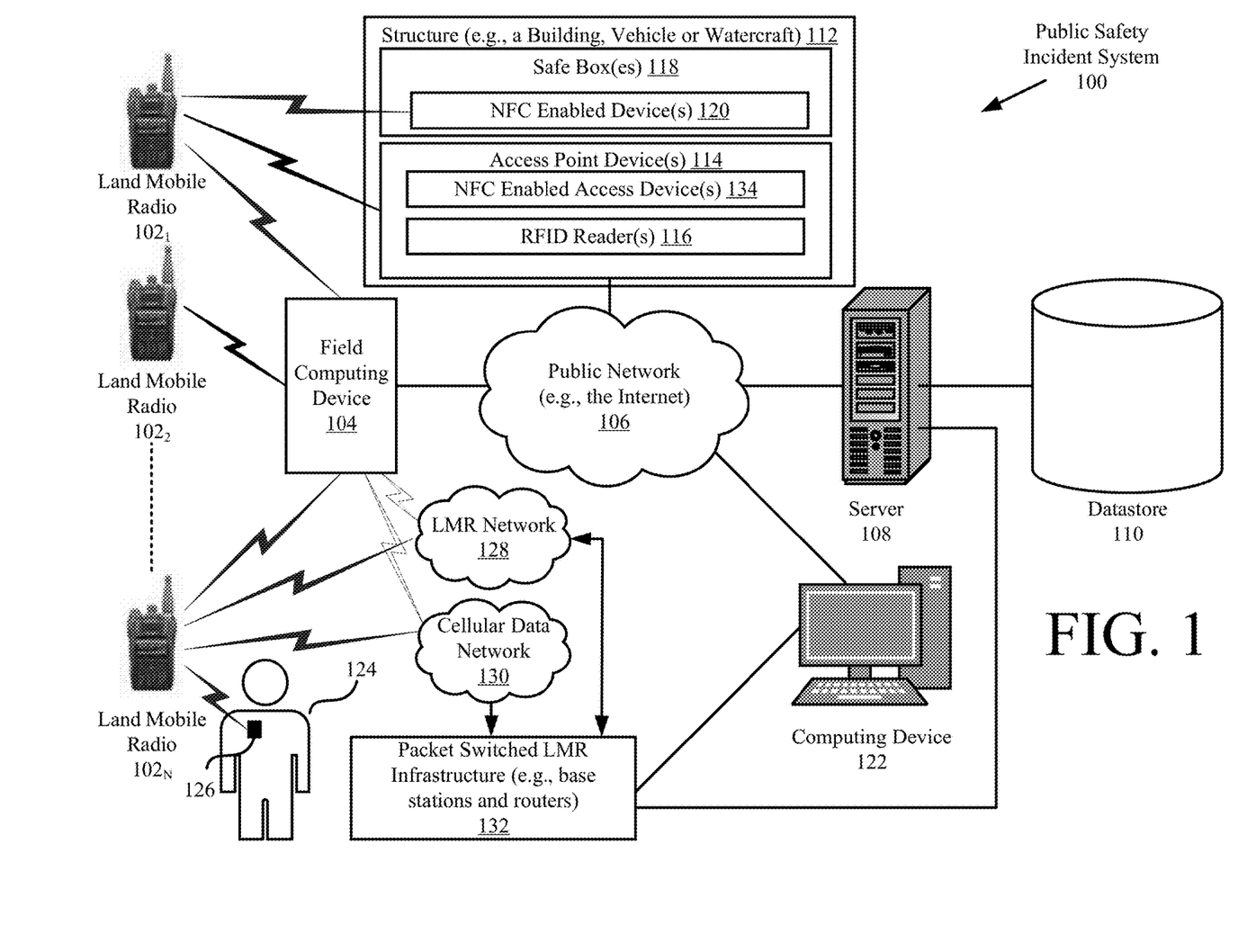
FIG. 1 is a perspective view of an illustrative public safety incident system.

Referring now to FIG. 1, there is provided an illustration of an illustrative public safety incident system 100. System 100 is designed to manage operations by a field personnel member 124 of public safety and security organizations (e.g., the fire department, police department and/or other emergency response organizations). Each field personnel member is assigned and provided an LMR $102_1$, $102_2$, . . . , $102_N$ (collectively referred to as "102"). Similar to conventional LMRs (e.g., the LMR disclosed in U.S. Pat. No. 8,145,262), the LMR $102_1$, $102_2$, . . . , $102_N$ is configured to provide communication with other LMRs and/or a packet switched LMR infrastructure 132 via an LMR network 128 and/or a cellular data network 130. The packet switched LMR infrastructure 132 includes, but is not limited to, base stations and/or routers.

However, the LMR $102_1$, $102_2$, . . . , $102_N$ additionally implements NFC technology, RFID technology, and/or SRC technology. The NFC and RFID technologies facilitate communications between the LMR and a field computing device 104 for incident check-in/check-out purposes. The field computing device 104 includes, but is not limited to, an LMR, a ruggedized tablet, or other incident command solution. The NFC technology also facilitates communication between the LMR and NFC enabled access device(s) 134 installed at access points (e.g., entry ways or pass-through) of the structure 112 (e.g., a building, vehicle, or watercraft). The RFID technology also facilitates communications between the LMR and/or RFID tag reader(s) 116 placed at the same or different access point(s) 114 (e.g., an entryway or pass through) of the structure (e.g., a building).

During these NFC and RFID communications, unique identifiers are provided to the field computing device 104, NFC enabled access devices 134, and/or RFID reader(s) 116. RFID readers are well known in the art, and therefore will not be described herein. These unique identifiers are used by the field computing device 104 and/or RFID reader(s) 116 to identify the individual field personnel members 124 that are checking-into an incident event, checking-out of an incident event, entering the structure, exiting the structure, and/or located in proximity to a particular pass-through or area internal to the structure. The field computing device 104 and/or RFID reader(s) 116 provide(s) the unique identifiers to one or more remote computing devices 108, 122 along with timestamp information and/or an indication as to whether the unique identifier is associated with a check-in action, a check-out action, an entering action, an exiting action, and/or an internal passing through action. The remote computing devices include, but are not limited to, a remote server 108 and/or computing device 122 (e.g., a dispatch console). The information sent from the field computing device 104 and/or RFID reader(s) 116 is stored in a datastore 110. The information is sent from the field computing device 104 via a packet switched LMR infrastructure 132 and/or a public network 106 (e.g., the Internet). The information is sent from the RFID reader(s) 116 via the public network 106.

The NFC also facilitates bi-directional communications between the LMR and safe box(es) 118 and/or other items located in, on or coupled to a part of the structure 112, and/or between the LMR and doors (not shown) and/or windows (not shown) providing access to the structure 112. The safe box(es) 118 include(s), but is(are) not limited to, rapid access box(es). A rapid access box is generally a small (possibly wall-mounted) safe that holds items (e.g., keys, access cards, access codes, medicine, etc.) that can be retrieved during emergency situations. The rapid access box is unlocked when it receives a unique identifier from one of the LMRs via an NFC communication, and verifies that the unique identifier is associated with an individual that is authorized to obtain access to the rapid access box's contents (e.g., by comparing the unique identifier to a pre-stored list of unique identifiers). Rapid access boxes are well known in the art, and therefore will not be described further herein.

The NFC further facilitates simpler pairing between the LMR and sensor(s) 126 worn by a respective field personnel member 124, as compared to that provided by SRC technology. Still, it should be noted that in some scenarios, SRC technology is used instead of NFC technology to pair an LMR to sensors worn by a respective field personnel member. After a successful pairing between the LMR and sensor(s), the SRC technology is used for wireless communications between the paired devices. The sensor(s) 126 include, but are not limited to, a heart rate sensor, a blood pressure sensor, a body temperature sensor, a moisture sensor, video/image camera, microphone, respiration sensor, and/or a motion sensor. The sensor data generated by the sensor(s) 126 is communicated to the LMR and stored in an internal memory of the LMR. The NFC technology and/or RFID technology can be used to communicate this sensor data to an external device 108, 122 (e.g., along with the check-in information and/or check-out information). Alternatively or additionally, this sensor data is communicated from the LMR using the LMR network 128 and/or the cellular data network 130.

Figure 2:
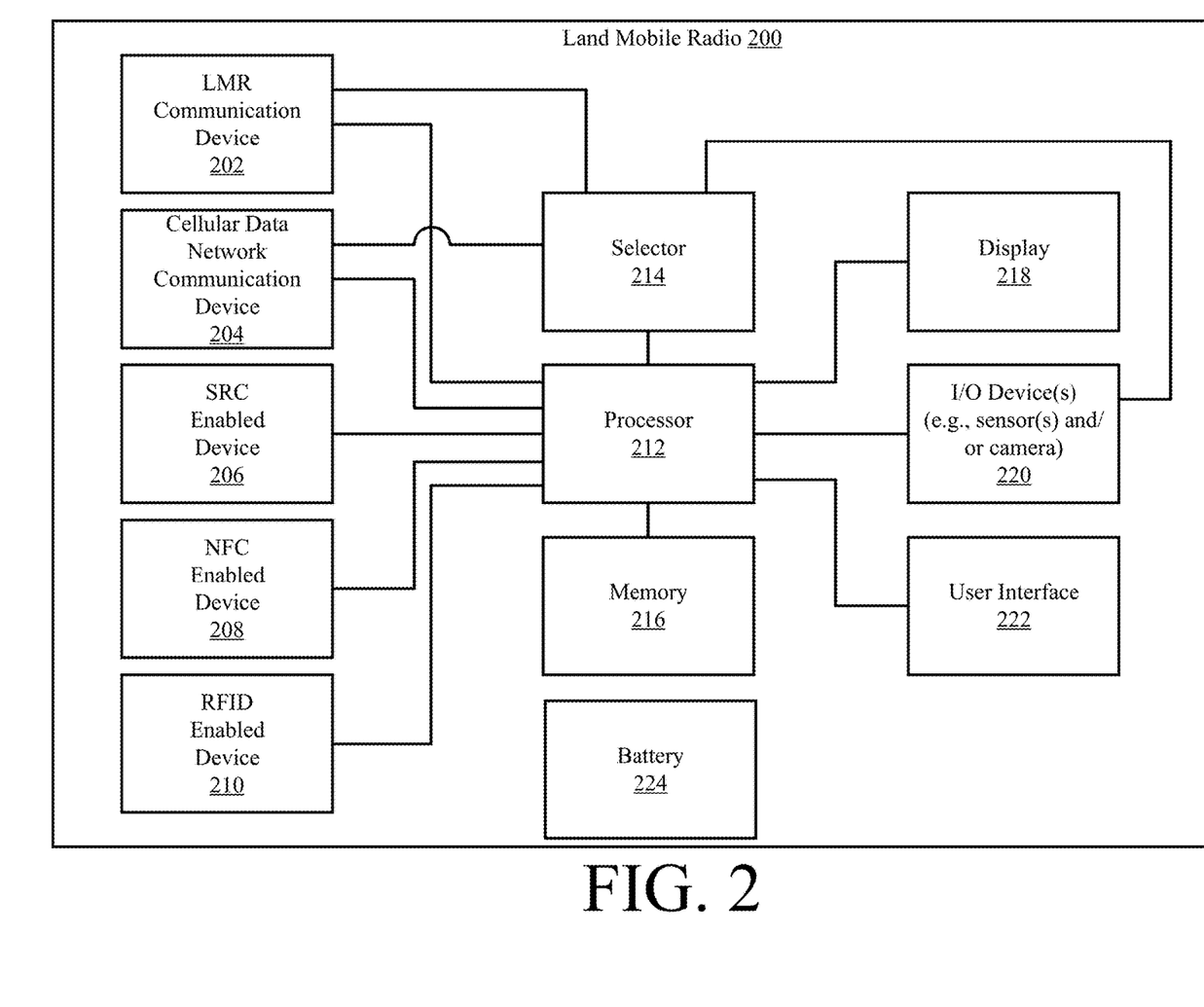
FIG. 2 is an illustration of an illustrative architecture for a Land Mobile Radio ("LMR") shown in FIG. 1.

Referring now to FIG. 2, there is provided an illustration of an illustrative architecture for an LMR 200. LMRs 102 of FIG. 1 are the same as or similar to LMR 200. As such, the discussion of LMR 200 is sufficient for understanding LMRs 102 of FIG. 1.

LMR 200 can include more or less components than that shown in FIG. 2 in accordance with a given application. For example, LMR 200 can include one or both components 208 and 210. The present solution is not limited in this regard.

As shown in FIG. 2, the LMR 200 comprises an LMR communication device 202 and a cellular data network communication device 204. Both of these communication devices 202, 204 enable end-to-end LMR services in manners known in the art. For example, the end-to-end LMR services are achieved in the same or similar manner as that taught in U.S. Pat. No. 8,145,262. The present solution is not limited in this regard. In this way, voice data is communicated from the LMR 200 over an LMR network (e.g., LMR network 128 of FIG. 1) and/or a cellular data network (e.g., cellular data network 130 of FIG. 1). A processor 212 and selector 214 are provided to select whether the LMR network or the cellular data network is to be used for communicating voice data at any given time.

The LMR 200 also comprises an SRC enabled device 206, an NFC enabled device 208 and/or an RFID enabled device 210. The SRC enabled device 206 facilitates SRC communications. An SRC communication occurs between the LMR 200 and an external device (e.g., body worn sensors 126 of FIG. 1) over a short distance (e.g., Y feet, where Y is an integer such as ten). The SRC communication may be achieved using SRC transceivers. SRC transceivers are well known in the art, and therefore will not be described in detail herein. Any known or to be known SRC transceiver can be used herein without limitation. For example, a Bluetooth® or Wi-Fi enabled transceiver is used here. The present solution is not limited in this regard.

The NFC enabled device 208 facilitates NFC communications. An NFC communication occurs between the LMR 200 and an external device (e.g., field computing device 104 of FIG. 1 or safe box 118 of FIG. 1) over a relatively small distance (e.g., X centimeters or C inches, where C is an integer such as twelve). The NFC communication may be established by touching the LMR 200 and the external device together or bringing them in close proximity such that an inductive coupling occurs between inductive circuits thereof. In some scenarios, the NFC operates at 13.56 MHz and at rates ranging from 106 kbit/s to 848 kbit/s. The NFC communication may be achieved using NFC transceivers configured to enable contactless communication at 13.56 MHz. NFC transceivers are well known in the art, and therefore will not be described in detail herein. Any known or to be known NFC transceiver can be used herein without limitation. In some scenarios, the NFC enabled device 208 comprises an NFC tag or maker. NFC tags and markers are well known in the art, and will not be described herein.

The RFID enabled device 210 facilitates RFID communications. An RFID communication occurs between the LMR 200 and an external device (e.g., field computing device 104 of FIG. 1 or RFID reader 116 of FIG. 1) over relatively short distance (e.g., W feet, where W is an integer such as 30 feet). The RFID communication may be achieved using an RF antenna and/or RF transceiver. RF antennas and RF transceivers are well known in the art, and therefore will not be described in detail herein. Any known or to be known RF antenna and/or RF transceiver can be used herein without limitation. In some scenarios, the RFID enabled device 210 comprises a passive RFID tag or an active RFID tag. Both of the listed RFID tags are well known in the art, and will not be described herein.

The above-described communication components 202-210 are connected to a processor 212. A memory 216, display 218, user interface 222 and Input/Output ("I/O") device(s) 220 are also connected to the processor 212. During operation, the processor 212 is configured to control selection of either the LMR communication device 202 or the cellular data communication device 204 for providing LMR services using the selector 214. The processor 212 is also configured to collect and store data generated by the I/O device(s) 220 and/or external devices (e.g., body worn sensors 126 of FIG. 1). The I/O device(s) include(s), but is(are) not limited to, cameras, microphones, and/or sensors (e.g., environmental sensors and/or motion sensors). Accordingly, the data stored in memory 216 can include, but is not limited to, images, videos, audio and/or sensor data (e.g., temperature data, moisture data, light data, etc.). This stored data and/or other stored data (e.g., a unique identifier for the LMR 200) can be communicated from the LMR 200 via any communication device 202-210 in accordance with a given application.

The user interface 222 includes, but is not limited to, a plurality of user depressible buttons that may be used, for example, for entering numerical inputs and selecting various functions of the LMR 200. This portion of the user interface may be configured as a keypad. Additional control buttons and/or rotatable knobs may also be provided with the user interface 222. The user interface 222 may additionally or alternatively comprise a touch screen display, and/or a microphone to facilitate voice-activated commands.

A battery 224 is provided for powering the components 202-222 of the LMR 200. The battery 224 may comprise a rechargeable and/or replaceable battery. Batteries are well known in the art, and therefore will not be discussed here.

Figure 3:
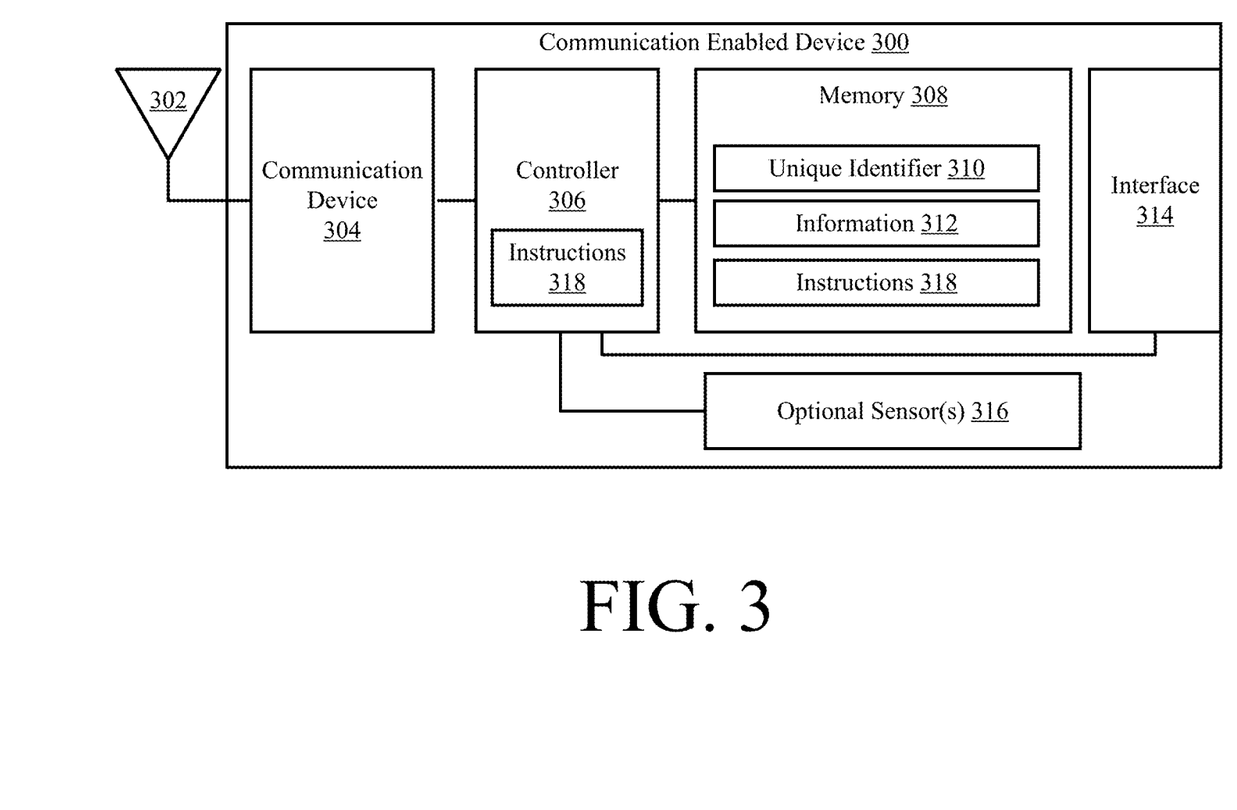
FIG. 3 is an illustration of an illustrative architecture for a communication enable device.

Referring now to FIG. 3, there is provided an illustration of an illustrative architecture for a communication enabled device 300. The SRC enabled device 206, NFC enabled device 208, and/or RFID enabled device 210 of FIG. 2 is(are) the same as or similar to the communication enabled device 300. Therefore, the discussion of communication enabled device 300 is sufficient for understanding SRC enabled device 206, NFC enabled device 208, and/or RFID enabled device 210 of FIG. 2.

Communication enabled device 300 can include more or less components than that shown in FIG. 3. However, the components shown are sufficient to disclose an illustrative embodiment implementing the present solution. Some or all of the components of the communication enabled device 300 can be implemented in hardware, software and/or a combination of hardware and software. The hardware includes, but is not limited to, one or more electronic circuits.

The hardware architecture of FIG. 3 represents an illustration of a representative communication enabled device 300 configured to facilitate (a) the checking-in of field personnel members to incident events, (b) the detection of when field personnel members access contents of safe boxes, (c) the detection of when field personnel members enter a structure, (d) the tracking of the field personnel member movement inside the structure, (e) the detection of when items are returned to the safe boxes, and/or (f) the checking-out of field personnel members from incident events.

The communication enabled device 300 also comprises an antenna 302 and a communication device 304 for allowing data to be exchanged with the external device via SRC technology, NFC technology, and/or RFID technology. The antenna 302 is configured to receive SRC, NFC and/or RFID signals from the external device and transmit SRC, NFC and/or RFID signals generated by the communication enabled device 300. The communication device 304 may comprise an SRC transceiver, an NFC transceiver and/or an RFID transceiver. SRC, NFC and RFID transceivers are well known in the art, and therefore will not be described herein. However, it should be understood that the SRC, NFC and/or RFID transceiver processes received signals to extract information therein. This information can include, but is not limited to, a request for certain information (e.g., a unique identifier 310 and/or other information 312), and/or a message including information, for example, about the health of a given individual and/or the successful access to contents of a safe box. The communication device 304 may pass the extracted information to the controller 306.

If the extracted information includes a request for certain information, then the controller 306 may perform operations to retrieve a unique identifier 310 and/or other information 312 from memory 308. The other information 312 can include, but is not limited to, sensor data received from body worn sensors (e.g., sensors 126 of FIG. 1), notification messages from safe boxes, and/or sensor data generated by additional optional sensors 316 (provided with an SRC, NFC and/or RFID enabled device) which provide information about a surrounding environment and/or motion of the communication enabled device 300. The optional sensors 316 can include, but are not limited to, temperature sensors, moisture sensors, chemical sensors, motion sensors, light sensors, smoke sensors, video/image cameras, microphones, and/or color sensors. The retrieved information is then sent from the communication device 304 to a requesting external device (e.g., field computing device 104 and/or RFID reader 116 of FIG. 1).

In some scenarios, the connections between components 304, 306, 308, 314, 316 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 308 may be a volatile memory and/or a non-volatile memory. For example, the memory 308 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 308 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The components 304-316 of the communication enabled device 300 are coupled to a power source (not shown in FIG. 3). The power source may include, but is not limited to, battery or a power connection (not shown). Alternatively or additionally, the communication enabled device 300 is configured as a passive device which derives power from an RF signal inductively coupled thereto.

Figure 4:
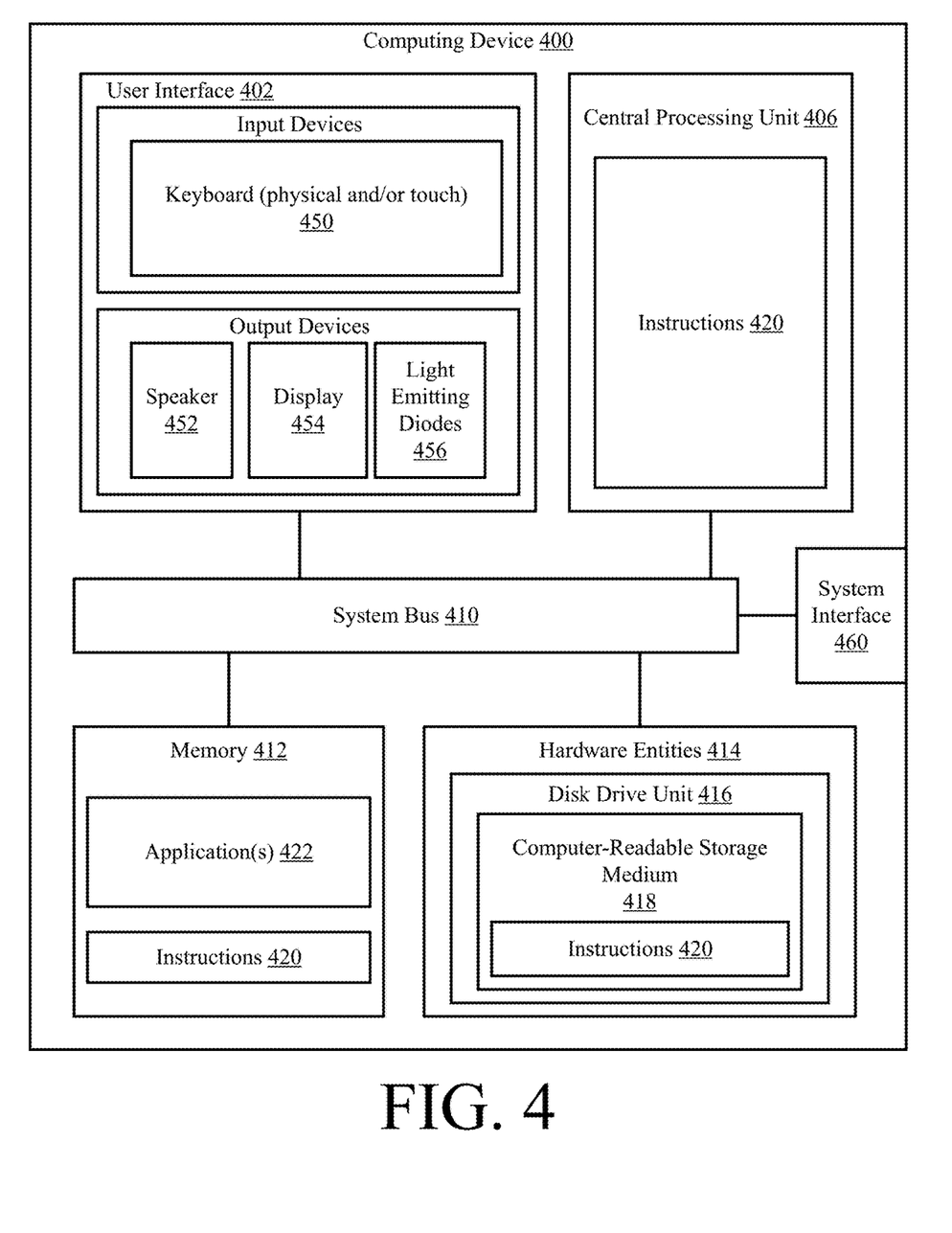
FIG. 4 is an illustration of an illustrative architecture for a computing device.

Referring now to FIG. 4, there is provided an illustration of an illustrative architecture for a computing device 400. Field computing device 104, computing device 122 and/or server 108 of FIG. 1 is(are) the same as or similar to computing device 400. As such, the discussion of computing device 400 is sufficient for understanding these component of system 100.

In some scenarios, the present solution is used in a client-server architecture. Accordingly, the computing device architecture shown in FIG. 4 is sufficient for understanding the particulars of client computing devices and servers.

Computing device 400 may include more or less components than those shown in FIG. 4. However, the components shown are sufficient to disclose an illustrative solution implementing the present solution. The hardware architecture of FIG. 4 represents one implementation of a representative computing device configured to provide an improved field personnel check-in, check-out and management process, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices may include, but are not limited, a physical and/or touch keyboard 450, a mouse, and/or a microphone. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, databases, etc.).

At least some of the hardware entities 414 perform actions involving access to and use of memory 412, which can be a Random Access Memory ("RAM"), a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Computing device 400 facilitates an improved field personnel check-in, check-out and management process. In this regard, computing device 400 runs one or more software applications 422 for facilitating the collection, processing and/or storage of field personnel related information and/or incident event related information. The field personnel related information includes, but is not limited to, biometric information, check-in status information, check-out status information, location information, video information, image information, audio information, and/or safe box access information. The incident event related information includes, but is not limited to, location information, time information, structure information, surrounding environment information, incident type information, field personnel on-site information, field equipment on-site information, video information, image information, audio information, and/or incident status information.

Illustrative Method for Managing an Incident Event

Figure 5A:
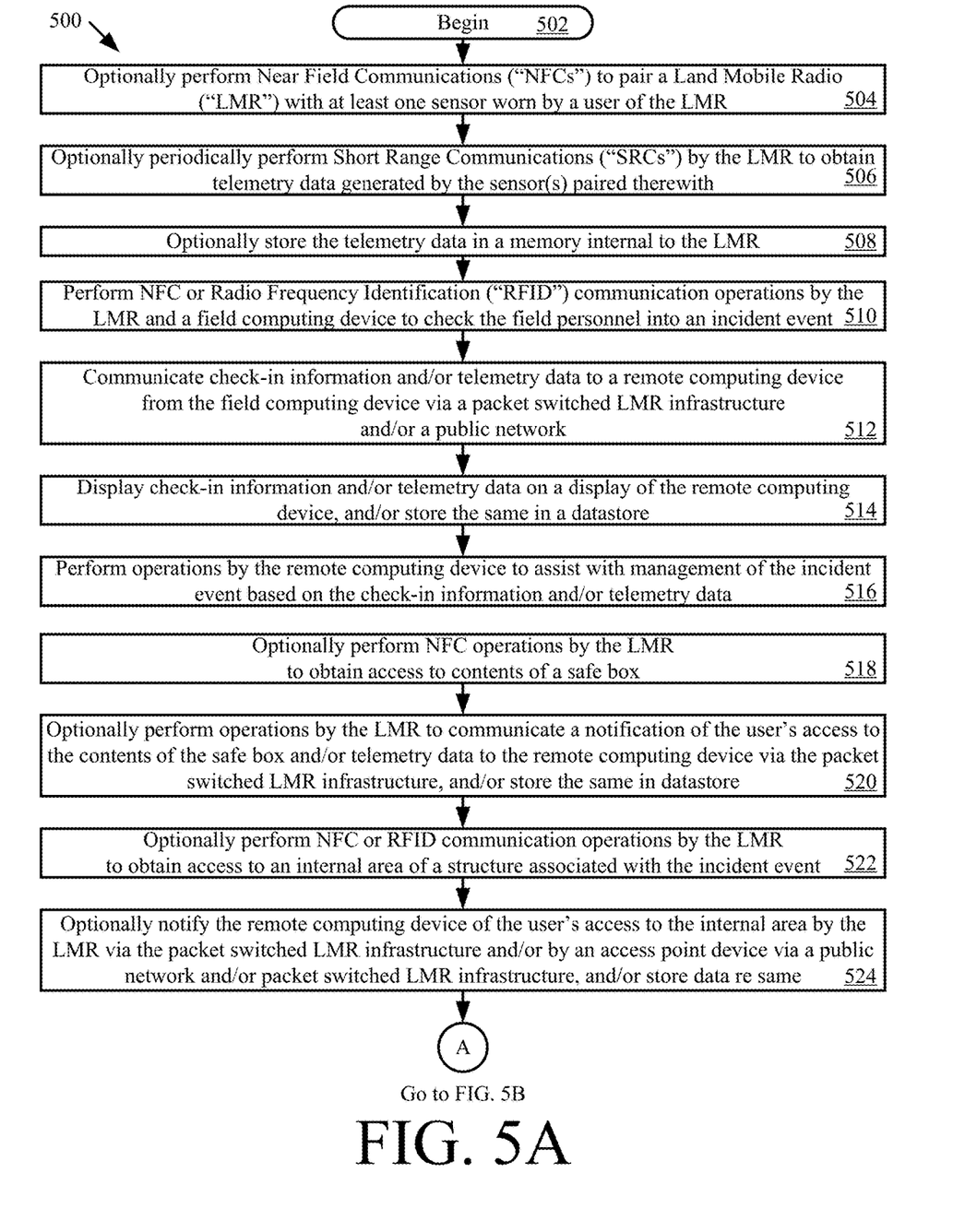
FIGS. 5A-5B (collectively referred to as "FIG. 5") provide a flow diagram of an illustrative method for managing an incident event.

Referring now to FIG. 5, there is provided a flow diagram of an illustrative method 500 for managing an incident event. Method 500 begins with 502 and continues with 504 where NFCs are optionally performed to pair an LMR (e.g., LMR $102_1$, $102_2$, ..., or $102_N$ of FIG. 1) with at least one sensor (e.g., sensor 126 of FIG. 1) worn by a user of the LMR (e.g., field personnel member 124 of FIG. 1). Next in 506, SRCs are optionally performed by the LMR to obtain telemetry data by the sensor(s) that were paired with the LMR in previous 504. The telemetry data can include, but is not limited to, heart rate data, blood pressure data, respiration data, body temperature data, moisture data, video/image data, audio data, and/or motion data. The telemetry data is optionally stored (at least temporarily) in an internal memory (e.g., memory 216 of FIG. 2 and/or memory 308 of FIG. 3) of the LMR, as shown by 508.

In 510, NFC or RFID communication operations are performed by the LMR and a field computing device (e.g., field computing device 104 of FIG. 1) to check the user into an incident event (e.g., a building fire or car crash). Check-in information and/or telemetry data is communicated to a remote computing device (e.g., server 108 and/or computing device 122 of FIG. 1) from the field computing device via a packet switched LMR infrastructure (e.g., packet switched LMR infrastructure 132 of FIG. 1) and/or a public network (e.g., public network 106 of FIG. 1). The check-in information can include, but is not limited to, a unique identifier for the LMR, a check-in time and/or a location of the LMR at the time of checking-in. In 514, the check-in information and/or telemetry data is displayed on a display (e.g., display 454 of FIG. 4) of the remote computing device. The check-in information and/or telemetry data may also be stored in a datastore (e.g., datastore 110 of FIG. 1). The check-in information and/or telemetry data is then used by the remote computing device (e.g., dispatch console) to assist with the management of the incident event, as shown by 516. In this regard, the user (e.g., dispatcher) may input information and/or commands into the remote computing device to cause the remote computing device to perform certain actions which facilitate the management of the incident event (e.g., send messages to the LMRs of field personnel members with instructions how to handle an incident event and/or which field personnel members should handle and/or remain on-site of the incident event).

In optional 518, NFC operations are performed by the LMR to obtain access to contents of a safe box (e.g., safe box 118 of FIG. 1). The LMR then optionally performs operations in 520 to communicate a notification of the user's access to the contents of the safe box at the given time and/or telemetry data to the remote computing device via the packet switched LMR infrastructure. The notification, other data regarding the user's access to the contents of the safe box, and/or the telemetry data may also be stored in the datastore (e.g., datastore 110 of FIG. 1).

In optional 522, NFC or RFID communication operations are optionally performed by the LMR to obtain access to an internal area of a structure associated with the incident event (e.g., structure 112 of FIG. 1). In this regard, the LMR communicates with an access point device (e.g., access point device 114 of FIG. 1) of the structure. The access point device can include, but is not limited to, an electro-mechanical door lock device, an electro-mechanical window lock device, or a security system device (e.g., an access card reader). In 524, the remote computing device is optionally notified of the user's access to the internal area at the given time. This notification is provided by the LMR via the packet switched LMR network and/or the public network. The notification and/or other data regarding the user's access to the internal area may also be stored in the datastore (e.g., datastore 110 of FIG. 1). Upon completing 524, method 500 continues with optional 526 of FIG. 5B.

Figure 5B:
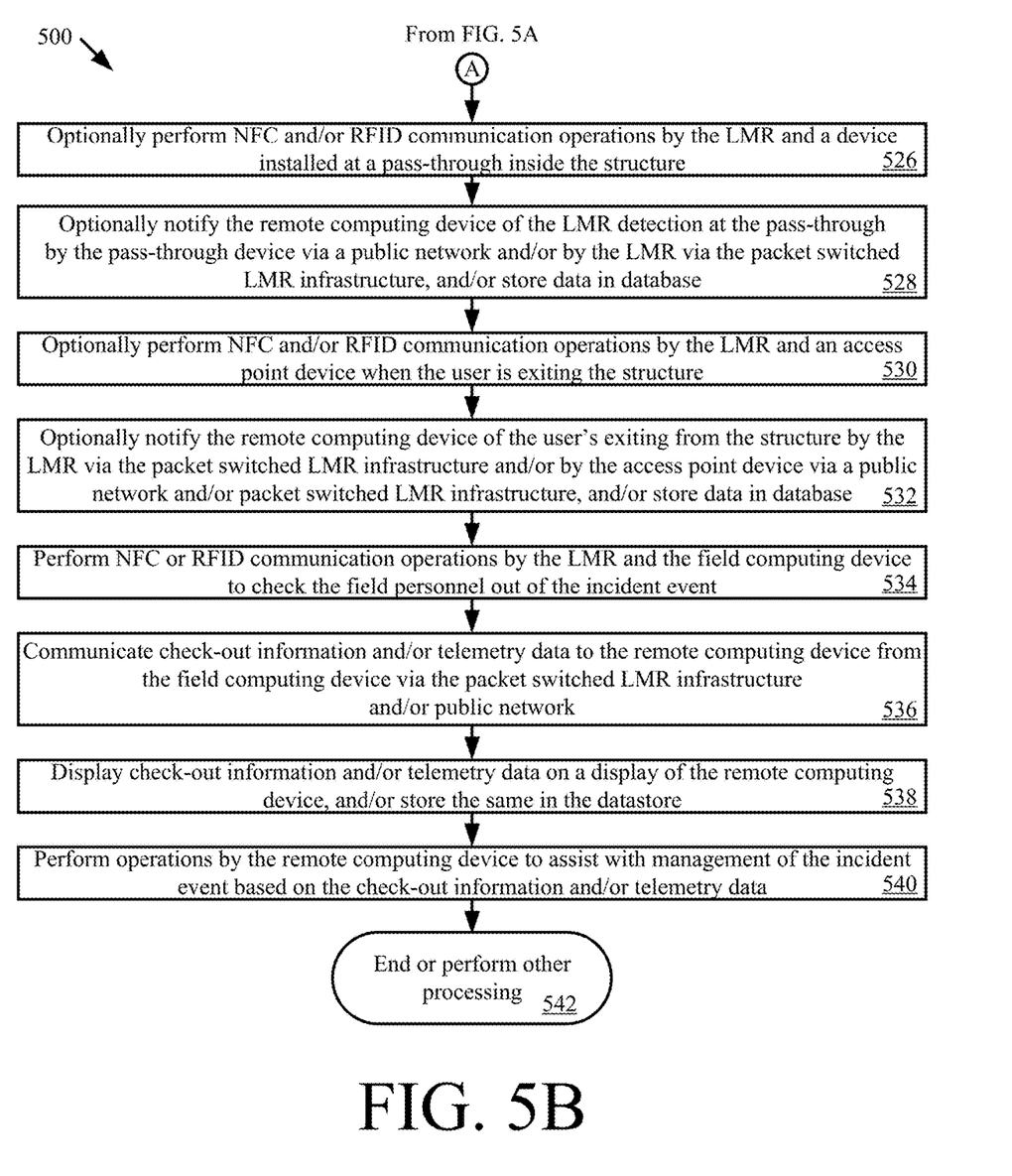

As shown in FIG. 5B, 526 involves optionally performing NFC and/or RFID communication operations by the LMR and a device installed at a pass-through inside the structure (e.g., an access point device 114 of FIG. 1 that is installed at an entrance to an internal room of the structure). The remote computing device is optionally notified in 528 of the pass-through device's detection of the LMR at the pass-through. This notification can be provided by the pass-through device via the public network and/or by the LMR via the packet switched LMR infrastructure. The notification and/or other data regarding the pass-through device's detection of the LMR at the pass-through may also be stored in the datastore (e.g., datastore 110 of FIG. 1).

In optional 530, NFC and/or RFID communication operations are performed by the LMR and an access point device (e.g., access point device 114 of FIG. 1) when the user is exiting the structure. The access point device can include, but is not limited to, an electro-mechanical door lock device, an electro-mechanical window lock device, or a security system device (e.g., an access card reader). The remote computing device is optionally notified in 532 of the user's exiting from the structure. This notification can be provided by the LMR via the packet switched LMR infrastructure, and/or by the access point device via the public network and/or the packet switched LMR infrastructure. The notification and/or other data regarding the user's exiting from the structure may also be stored in the datastore (e.g., datastore 110 of FIG. 1).

In 534, NFC or RFID communication operations are performed by the LMR and the field computing device to check the field personnel member out of the incident event. Check-out information and/or telemetry data is sent from the field computing device to the remote computing device, as shown by 536. The field computing device can use the packet switched LMR infrastructure and/or the public network in this regard. The check-out information can include, but is not limited to, a unique identifier for the LMR, a check-out time and/or a location of the LMR at the time of checking-out. The check-out information and/or telemetry data is then displayed on the display of the remote computing device in 538. The check-out information and/or telemetry data may also be stored in the datastore. The check-out information and/or telemetry data is then used by the remote computing device (e.g., dispatch console) to assist with the management of the incident event, as shown by 540. In this regard, the user (e.g., dispatcher) may input information and/or commands into the remote computing device to cause the remote computing device to perform certain actions which facilitate the management of the incident event (e.g., send messages to the LMRs of field personnel members with instructions how to handle an incident event and/or which field personnel members should handle and/or remain on-site of the incident event). Subsequently, 542 is performed where method 500 ends or other processing is performed (e.g., return to 502 of FIG. 5A).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for managing an incident event by a public safety and security organization, comprising:
    performing Near Field Communication ("NFC") or Radio Frequency Identification ("RFID") operations by a Land Mobile Radio ("LMR") and a portable field computing device to check-in a field personnel member into an incident event immediately prior to the field personnel member entering a physical structure, the field personnel member being in possession of the LMR, and both the LMR and the portable field computing device being located at a given site;
    communicating check-in information to a remote computing device from the portable field computing device via a packet switched LMR infrastructure or a public network to report a presence of the field personnel member at the given site and an entering of the field personnel into a physical structure to the public safety and security organization, the check-in information comprising a check-in time specifying a time (i) at which the field personnel member was registered at a location of the incident event and (ii) that occurred immediately prior to when the field personnel member entered the physical structure;
    using the check-in information by the remote computing device to facilitate management of the incident event by the public safety and security organization as the incident event is being addressed by at least the field personnel member;
    performing NFC or RFID operations by the LMR and the portable field computing device to check-out the field personnel member from the incident event immediately after the field personnel member exited the physical structure;
    communicating check-out information to the remote computing device from the portable field computing device via the packet switched LMR infrastructure or the public network, the check-out information comprising a check-out time specifying a time (i) at which the field personnel member was checked-out of the incident event and (ii) that occurred immediately subsequent to the when the field personnel member exited the physical structure; and
    using the check-out information by the remote computing device to assist in managing the incident event.

2. The method according to claim 1, further comprising performing NFC operations to pair the LMR with at least one sensor worn by the field personnel member.

3. The method according to claim 1, further comprising periodically performing Short Range Communications ("SRCs") by the LMR to obtain telemetry data generated by at least one sensor paired with the LMR.

4. The method according to claim 3, further comprising communicating the telemetry data along with the check-in information to the remote computing device.

5. The method according to claim 1, further comprising performing NFC operations by the LMR to obtain access to contents of a safe box.

6. The method according to claim 5, further comprising communicating a notification of the field personnel's access to the safe box's content from the LMR to the remote computing device via the packet switched LMR infrastructure.

7. The method according to claim 6, further comprising communicating telemetry data along with the notification to the remote computing device, the telemetry data generated by at least one sensor being worn by the field personnel member.

8. The method according to claim 1, further comprising performing NFC or RFID operations by the LMR to obtain access to an internal area of a structure that is associated with the incident event.

9. The method according to claim 8, further comprising notifying the remote computing device of the field personnel member's access to the internal area of the structure by the LMR or an access point device via the packet switched LMR infrastructure.

10. The method according to claim 1, further comprising performing NFC or RFID operations by the LMR and a device installed at a pass-through inside a structure.

11. The method according to claim 10, further comprising notifying the remote computing device of the LMR detection at the pass-through by the LMR via the packet switched LMR infrastructure.

12. The method according to claim 1, further comprising performing NFC or RFID operations by the LMR and an access point device when the field personnel member is exiting the structure.

13. The method according to claim 12, further comprising notifying the remote computing device of the field personnel member's exiting from the structure by the LMR or access point device via the packet switched LMR infrastructure.

14. The method according to claim 1, further comprising communicating the telemetry data along with the check-out information to the remote computing device, the telemetry data generated by at least one sensor being worn by the field personnel member.

15. A system, comprising:
 a Land Mobile Radio ("LMR") configured to be used by a field personnel member; and
 a portable field computing device configured to:
  perform Near Field Communications ("NFCs") or Radio Frequency Identification ("RFID") communications with the LMR to check-in the field personnel member into an incident event when both the LMR and the portable field computing device are located at a given site and immediately prior to the field personnel member entering a physical structure;
  communicate check-in information over a packet switched LMR infrastructure or a public network (i) to report a presence of the field personnel member at the given site to the public safety and security organization, (ii) to report the field personnel member entering the physical structure, and (iii) to facilitate management of the incident event by the public safety and security organization as the incident event is being addressed by at least the field personnel member, wherein the check-in information comprises a check-in time specifying a time (i) at which the field personnel member was registered at a location of the incident event and (ii) that occurred immediately prior to when the field personnel member entered the physical structure;
  perform NFC or RFID operations by the LMR and the portable field computing device to check-out the field personnel member from the incident event immediately after the field personnel member exited the physical structure;
  communicate check-out information to the remote computing device from the portable field computing device via the packet switched LMR infrastructure or the public network, the check-out information comprising a check-out time specifying a time (i) at which the field personnel member was checked-out of the incident event and (ii) that occurred immediately subsequent to the when the field personnel member exited the physical structure; and
  use the check-out information by the remote computing device to assist in managing the incident event.

16. The system according to claim 15, further comprising at least one sensor worn by the field personnel member that is able to be paired to the LMR using NFCs.

17. The system according to claim 15, wherein the LMR periodically performs Short Range Communications ("SRCs") to obtain telemetry data generated by at least one sensor.

18. The system according to claim 17, wherein the telemetry data is communicated along with the check-in information from the portable field computing device.

19. The system according to claim 15, wherein the LMR performs NFC operations to allow the field personnel member to obtain access to contents of a safe box.

20. The system according to claim 19, wherein the LMR communicates a notification of the field personnel's access to the safe box's content over the packet switched LMR infrastructure.

21. The system according to claim 20, wherein telemetry data is communicated along with the notification over the packet switched LMR infrastructure, the telemetry data generated by at least one sensor being worn by the field personnel member.

22. The system according to claim 15, wherein the LMR performs NFC or RFID operations to allow the field personnel member to obtain access to an internal area of a structure that is associated with the incident event.

23. The system according to claim 22, wherein a notification of the field personnel member's access to the internal area of the structure is communicated over the packet switched LMR infrastructure.

24. The system according to claim 15, wherein the LMR performs NFC or RFID communications with a device installed at a pass-through inside a structure.

25. The system according to claim 24, wherein a notification of the LMR detection at the pass-through is sent over the packet switched LMR infrastructure by the LMR.

26. The system according to claim 15, wherein the LMR performs NFC or RFID communications with an access point device when the field personnel member is exiting the structure.

27. The system according to claim 26, wherein a notification of the field personnel member's exiting from the structure is sent over the packet switched LMR infrastructure.

28. The system according to claim 15, wherein telemetry data is communicated along with the check-out information over the packet switched LMR infrastructure, the telemetry data generated by at least one sensor being worn by the field personnel member.

* * * * *